US012561126B2

(12) United States Patent
Maeda et al.

(10) Patent No.: US 12,561,126 B2
(45) Date of Patent: Feb. 24, 2026

(54) VEHICLE CONTROL APPARATUS

(71) Applicant: Mitsubishi Electric Corporation, Tokyo (JP)

(72) Inventors: Osamu Maeda, Tokyo (JP); Mitsuru Homma, Tokyo (JP); Hajime Hasegawa, Tokyo (JP); Daisuke Yase, Tokyo (JP); Tatsuya Maekoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 189 days.

(21) Appl. No.: 18/287,802

(22) PCT Filed: Jun. 8, 2021

(86) PCT No.: PCT/JP2021/021669
§ 371 (c)(1),
(2) Date: Oct. 20, 2023

(87) PCT Pub. No.: WO2022/259348
PCT Pub. Date: Dec. 15, 2022

(65) Prior Publication Data
US 2024/0201976 A1 Jun. 20, 2024

(51) Int. Cl.
*G06F 8/65* (2018.01)
*B60R 16/023* (2006.01)

(52) U.S. Cl.
CPC ............ *G06F 8/65* (2013.01); *B60R 16/0231* (2013.01)

(58) Field of Classification Search
CPC .................................................. G06F 8/60–75
See application file for complete search history.

(56) References Cited

U.S. PATENT DOCUMENTS

2006/0130037 A1* 6/2006 Mackay .................. G06F 8/658
717/168
2011/0107322 A1* 5/2011 Hashiguchi .............. G06F 8/65
717/170

(Continued)

FOREIGN PATENT DOCUMENTS

JP 2019-036855 A 3/2019

OTHER PUBLICATIONS

International Search Report for PCT/JP2021/021669 dated Aug. 24, 2021.

*Primary Examiner* — Duy Khuong T Nguyen
(74) *Attorney, Agent, or Firm* — Sughrue Mion, PLLC

(57) ABSTRACT

A vehicle control apparatus according to the present disclosure includes
two or more computing processing units,
storage apparatuses in each of which a program is stored,
an in-vehicle communication channel,
an outside-communication unit that receives updating-program information and data related to an updating program,
a program sorting unit that sorts updating program into an existing program and into a new program,
a new-program writing unit that receives a new program from the outside and then writes the new program in a storage area for the computing processing unit that executes an updating program, and
an existing-program writing unit that reads an existing program from the storage area where the existing program exists, by way of the in-vehicle communication channel, and then writes the existing program in a storage area for the computing processing unit that executes an updating program.

6 Claims, 9 Drawing Sheets

(56) References Cited

U.S. PATENT DOCUMENTS

| | | | | |
|---|---|---|---|---|
| 2016/0337169 A1* | 11/2016 | Chhabra | ................. | H04L 45/28 |
| 2020/0210167 A1 | 7/2020 | Ogawa et al. | | |
| 2021/0124592 A1* | 4/2021 | Yu | ........................... | G06F 8/658 |

* cited by examiner

| COMPUTING PROCESSING | STRORAGE AREA | PROGRAM | VERSION | FUNCTION | SOFTWARE FUNCTION SAFETY LEVEL | HARDWARE FUNCTION SAFETY LEVEL | INTEGRATED FUNCTION SAFETY LEVEL |
|---|---|---|---|---|---|---|---|
| FIRST COMPUTING PROCESSING UNIT | FIRST STORAGE APPARATUS | Prog1A | 1.0 | FUNCTION A | ASIL A | ASIL A | ASIL A |
| | | Prog1B | 2.0 | FUNCTION B | ASIL A | | ASIL A |
| | | : | : | : | : | | : |
| SECOND COMPUTING PROCESSING UNIT | SECOND STORAGE APPARATUS | Prog2A | 1.0 | FUNCTION C | ASIL A | QM | QM |
| | | Prog2A | 1.0 | FUNCTION D | QM | | QM |
| | | : | : | : | : | | : |

FIG.6

| COMPUTING PROCESSING | STRORAGE AREA | PROGRAM | VERSION | FUNCTION | | SOFTWARE FUNCTION SAFETY LEVEL | | HARDWARE FUNCTION SAFETY LEVEL | INTEGRATED FUNCTION SAFETY LEVEL |
|---|---|---|---|---|---|---|---|---|---|
| FIRST COMPUTING PROCESSING UNIT | FIRST STORAGE APPARATUS | Prog1C | 1.0 | FUNCTION F | | ASIL A | ASIL A | ASIL A | ASIL A |
| | | Prog2A | 1.0 | FUNCTION G | FUNCTION E | ASIL A | | | |

VEHICLE CONTROL APPARATUS

CROSS REFERENCE TO RELATED APPLICATIONS

This application is a National Stage of International Application No. PCT/JP2021/021669 filed Jun. 8, 2021.

TECHNICAL FIELD

The present disclosure relates to a vehicle control apparatus.

BACKGROUND ART

In the field of the automobile technology, electrification and high functionality of a vehicle have advanced in recent years; many kinds of vehicle apparatuses are mounted in a vehicle. As the vehicle apparatuses, there exist many kinds of vehicle apparatuses such as an engine control apparatus, an automatic transmission apparatus, a constant-speed-cruise apparatus, a braking control apparatus, an electric power steering apparatus, a display control apparatus for controlling displays such as a speed meter and the like, an airbag control apparatus, an autonomous driving apparatus, a traveling-motor control apparatus, and a charging control apparatus.

In order to control these various kinds of vehicle apparatuses, a vehicle control apparatus is mounted. A vehicle control apparatus is referred to as an ECU (Electronic Control Unit). Each of these vehicle control apparatuses includes a computing processing unit utilizing a microcomputer or the like. Then, the computing processing unit reads and executes a program stored in a storage apparatus (memory), so that control of the vehicle apparatuses is realized.

Each of the various kinds of vehicle apparatuses has a vehicle control apparatus; however, the functions of two or more vehicle apparatuses may integrally be controlled. In addition, in some cases, a vehicle control apparatus has two or more computing processing units, each of the computing processing units has a program stored in a storage apparatus (memory), and each of the programs is read and executed.

The program for each of these vehicle control apparatuses may be updated in order to raise the performance, even after the vehicle has been delivered to an end user (purchaser of the vehicle). A program to which a function has been added or whose function has been updated is transmitted from the outside of the vehicle; then, the program to be executed by the computing processing unit of the vehicle control apparatus is written in the storage apparatus.

When the program to be executed by the computing processing unit of the vehicle control apparatus is rewritten, there may be posed problems such as the possibility of a communication fault, an increase in the power consumption for the communication, and a long time required for the communication. There has been made public a technology in which these problems are coped with by selecting the shortest transmission path among two or more transmission paths between the outside of the vehicle and the subject vehicle control apparatus (e.g., Patent Document 1).

CITATION LIST

Patent Literature

Patent Document 1: Japanese Patent Application Laid-Open No. 2019-36855

SUMMARY OF INVENTION

Technical Problem

In the technology disclosed in Patent Document 1, the shortest transmission path among transmission paths between the outside of a vehicle and a vehicle control apparatus is selected so that data for rewriting a program is transmitted. Accordingly, the time required for transmitting the rewriting program can be made shortest. Shortening the transmission time for program data makes it possible to decrease the possibility of a communication fault and hence to reduce the power to be consumed in the communication. However, in the case where two or more computing processing units exist in a vehicle, the programs to which functions are added or which are updated from the outside of the vehicle may include a program that has already been stored in the storage area of the storage apparatus related to another computing processing unit.

In some cases, a program to be read from a storage area and executed by a computing processing unit includes two or more modules and the function thereof is fulfilled when the modules are combined. For example, let's consider the case where programs X and Y are newly added to the storage area of a program for a computing processing unit A and a function Z is achieved in a collaborative manner. In this situation, in some cases, the program Y has already been stored in the storage area of another computing processing unit B. When even in this case, the programs X and Y are transmitted through communication from the outside of the vehicle, the communication volume becomes large. Because even when the program Y having the same function exists in another computing processing unit, the program Y is rewritten through the communication with the outside of the vehicle, the volume of communication with the outside of the vehicle becomes unnecessarily large.

Because a program already stored in the storage area of another computing processing unit within a vehicle is transmitted from the outside of the vehicle, there are posed problems such as the possibility of a communication fault, an increase in the power consumption for the communication, and a long time required for the communication. Because the time for communication with the outside of the vehicle becomes longer, the communication band is compressed for a long time and hence the communication with the outside of the vehicle may be hindered. Moreover, the risk of being attacked by malicious communication or the risk of losing information due to a communication fault increases. Furthermore, because the communication with the outside of the vehicle becomes longer, the time in which addition of a program to the vehicle or update thereof is completed becomes longer; thus, it takes long time until transition to normal vehicle operation is achieved and hence the convenience for the end user is deteriorated. The technology disclosed in Patent Document 1 does not refer to this problem.

The present disclosure has been implemented in order to solve these problems. The objective thereof is to provide a vehicle control apparatus in which when a program for a computing processing unit mounted in a vehicle is updated, a program that has already been stored in a storage area of another computing processing unit is selected and excluded from subjects of transmission through communication with the outside of the vehicles so that the time for transmitting a rewriting program is shortened.

Solution to Problem

A vehicle control apparatus according to the present disclosure includes

3 two or more computing processing units, a storage area of a storage apparatus that is provided for each of the computing processing units and in which a program to be executed by the computing processing unit is stored, an in-vehicle communication channel that is utilized for communication among the computing processing units, an outside-communication unit that receives, from an outside, updating-program information related to an updating program for updating a program to be executed by the computing processing unit and data related to the updating program, a program sorting unit that sorts, based on the updating-program information, the updating program into an existing program already existing in the storage area for the computing processing unit excluding the computing processing unit that executes the updating program and into a new program that does not exist in any storage areas for the computing processing units, a new-program writing unit that receives, from the outside, data for the new program obtained through sorting by the program sorting unit, by way of the outside-communication unit, and then writes the data in the storage area for the computing processing unit that executes the updating program, by way of the in-vehicle communication channel, and an existing-program writing unit that reads data for the existing program obtained through sorting by the program sorting unit, from a transfer-source storage area by way of the in-vehicle communication channel, and then writes the data for the existing program in the storage area for the computing processing unit that executes the updating program, by way of the in-vehicle communication channel.

Advantageous Effects of Invention

In a vehicle control apparatus according to the present disclosure, when a program for a computing processing unit mounted in a vehicle is updated, a program that has already been stored in a storage area of another computing processing unit is selected and excluded from subjects of transmission through communication with the outside of the vehicles, so that the time for transmitting a rewriting program can be shortened.

BRIEF DESCRIPTION OF DRAWINGS

FIG. 1 is a configuration diagram of a vehicle control apparatus according to Embodiment 1;

FIG. 5 is an explanatory table for program information items stored in a storage area of a computing processing unit according to Embodiment 1;

FIG. 6 is an explanatory table for program information items that are in the storage area of the computing processing unit according to Embodiment 1 and are to be updated;

FIG. 8 is a configuration diagram of a vehicle control apparatus according to Embodiment 2;

4

Figure 9:
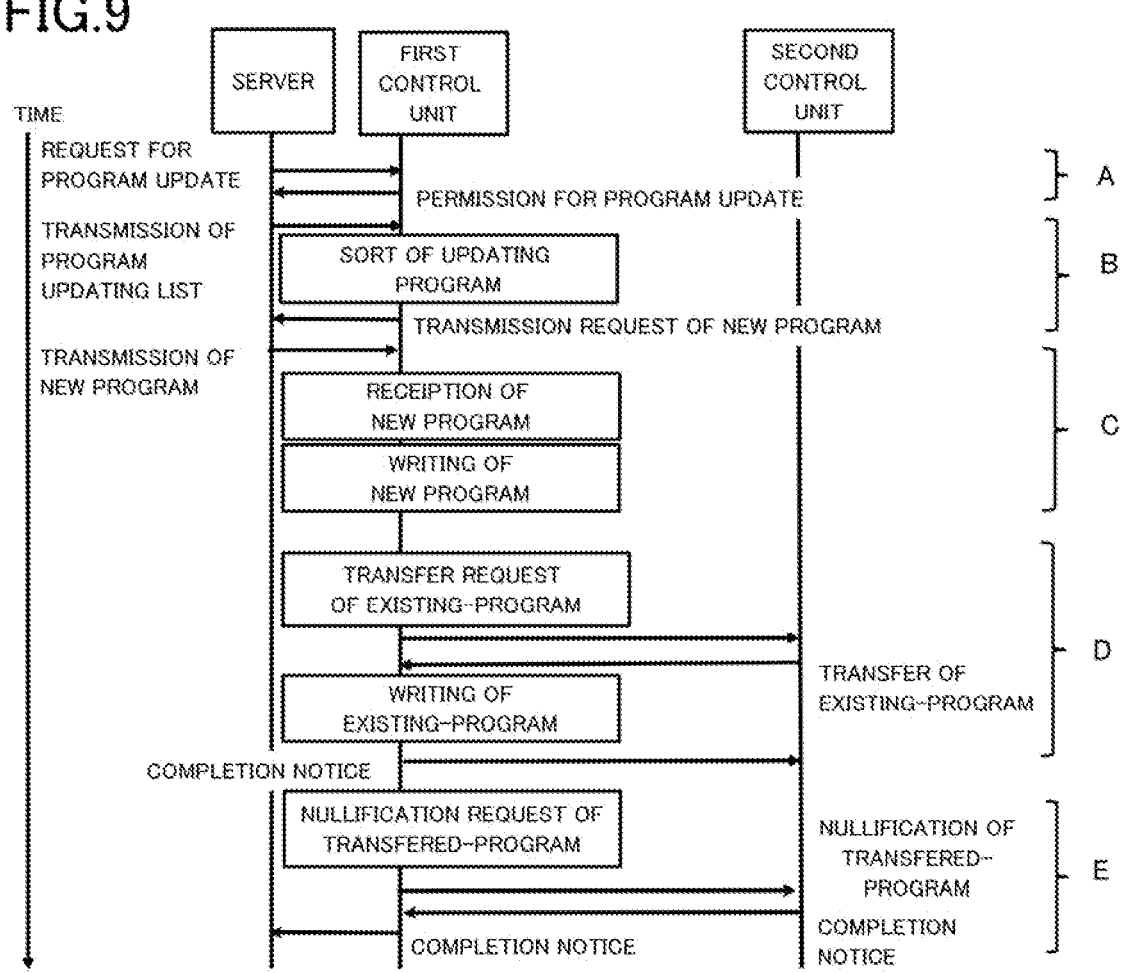
Figure 10:
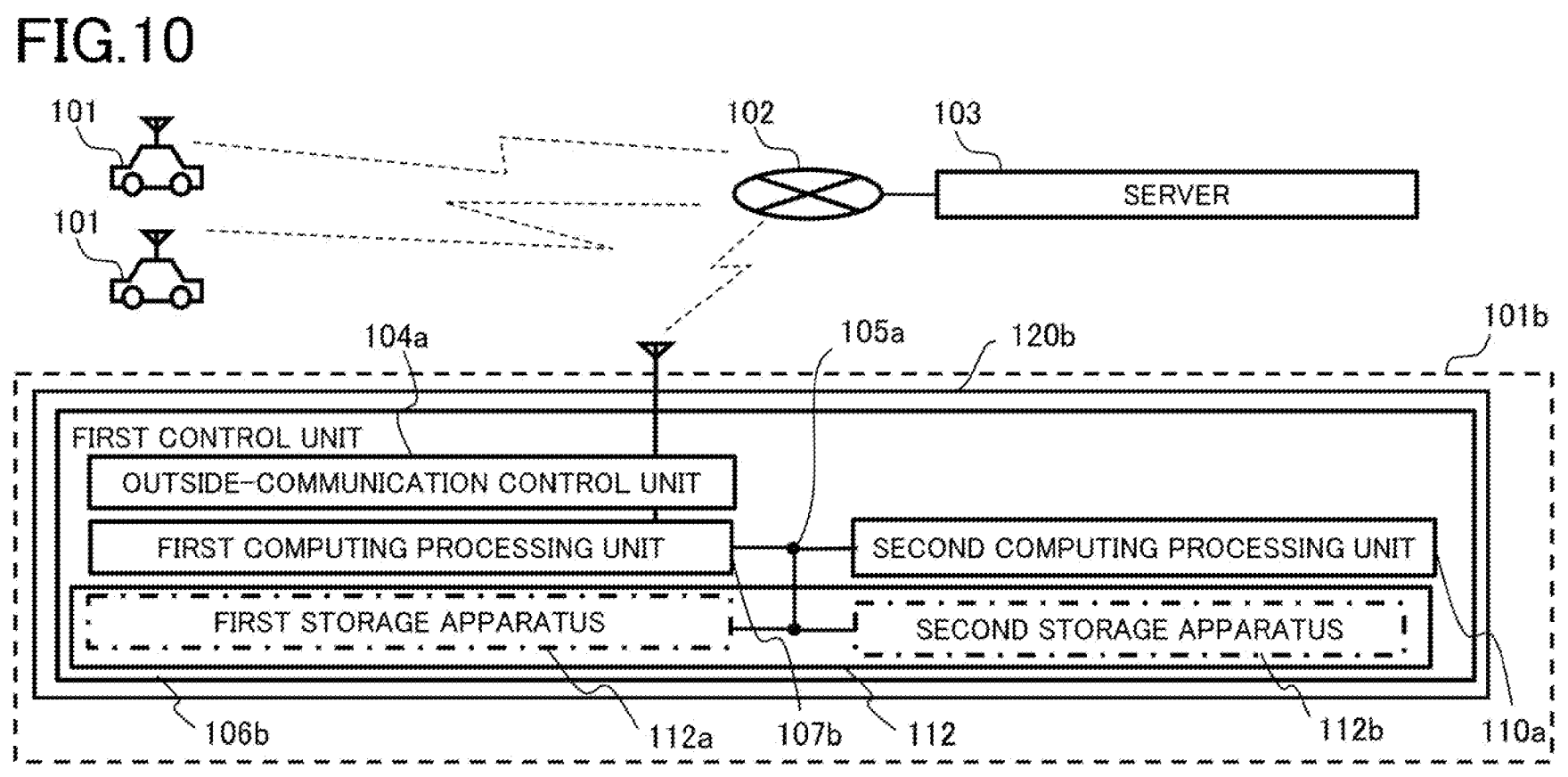

FIG. 9 is a sequence diagram of program updating processing according to Embodiment 2; and FIG. 10 is a configuration diagram of a vehicle control apparatus according to Embodiment 3.

DESCRIPTION OF EMBODIMENTS

Hereinafter, vehicle control apparatuses according to Embodiments of the present disclosure will be explained with reference to the drawings.

1. Embodiment 1

<Configuration of Vehicle Control Apparatus>

Figure 1:
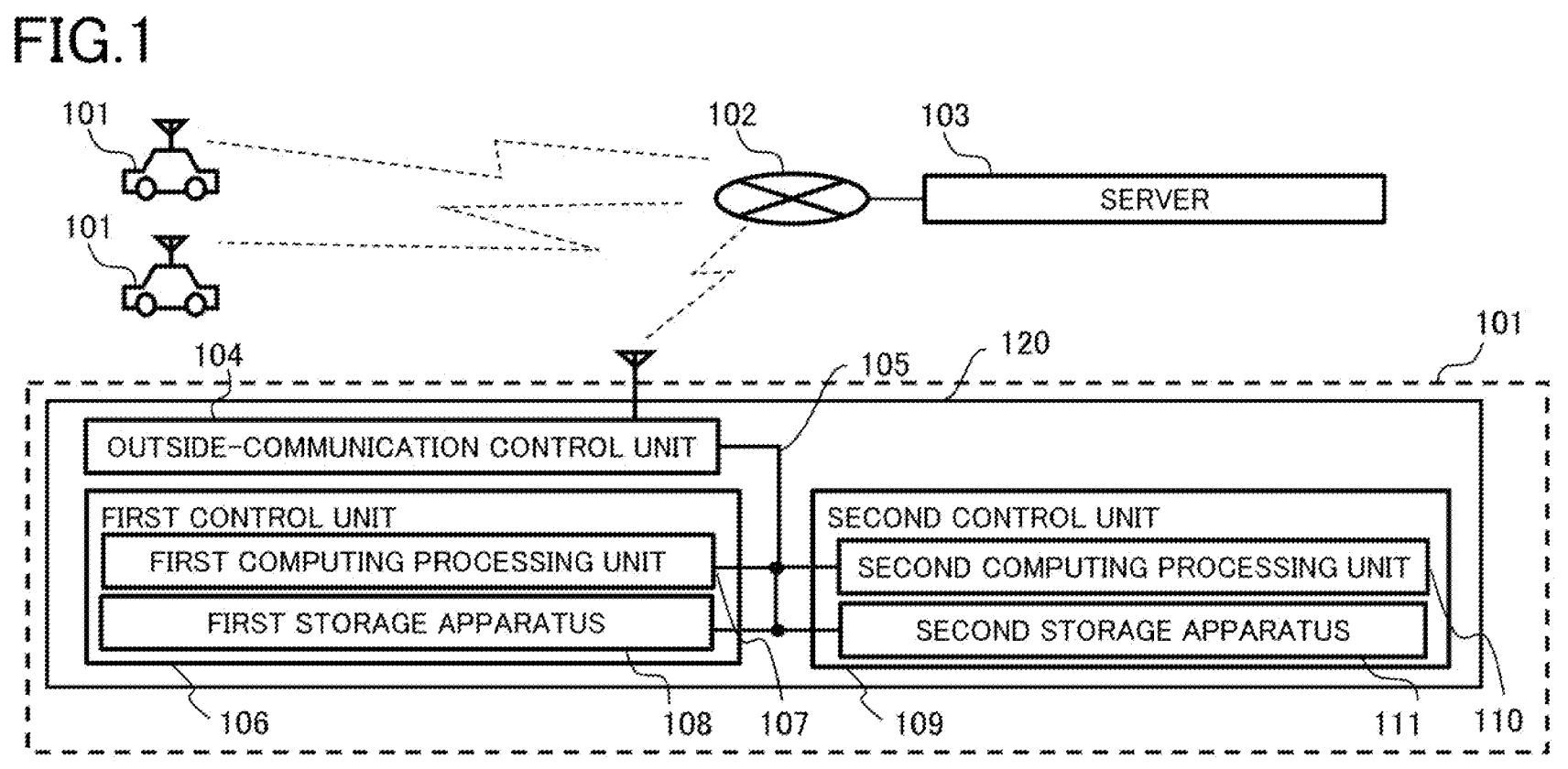

FIG. 1 is a configuration diagram of a vehicle control apparatus 120 according to Embodiment 1. Each of two or more vehicles 101 and a server 103 can mutually communicate with each other via a wide area network 102. The server 103 can transmit an updating program for raising a vehicle function to each of the vehicles 101.

The vehicle control apparatus 120 is mounted in the vehicle 101. The vehicle control apparatus 120 includes an outside-communication control unit 104, a first control unit 106, and a second control unit 109. The outside-communication control unit 104 communicates with the server 103 via the wide area network 102 and can receive updating data items for programs to be executed by the first control unit 106 and the second control unit 109. The first control unit 106 performs, for example, engine control; the second control unit 109 performs, for example, electric-power-steering control. The outside-communication control unit 104, the first control unit 106, and the second control unit 109 are connected with one another through an in-vehicle communication channel 105 and can exchange data with one another. The in-vehicle communication channel 105 is capable of performing communication through a communication line or an optical fiber and can perform communication at higher speed than the wide area network 102 that mediates electric waves.

It may be allowed that the vehicle 101 is provided with a vehicle control apparatus other than the vehicle control apparatus 120. In addition, it may be allowed that the vehicle control apparatus 120 is provided with another control unit in addition to the outside-communication control unit 104, the first control unit 106, and the second control unit 109.

The first control unit 106 is provided with a first computing processing unit 107 that performs computing processing, a first storage apparatus 108 having a storage area for storing programs to be executed by the first computing processing unit 107, data therefor, and the like, and an I/O interface (unillustrated) that performs inputting and outputting of various kinds of signals. The second control unit 109 is provided with a second computing processing unit 110 that performs computing processing, a second storage apparatus 111 having a storage area for storing programs to be executed by the second computing processing unit 110, data therefor, and the like, and an I/O interface (unillustrated) that performs inputting and outputting of various kinds of signals.

It may be allowed either that the vehicle control apparatus 120 is provided as an integrated control apparatus contained in a single case or that respective function units are contained in different cases and are connected with one another through the in-vehicle communication channel 105 so as to form a vehicle system as a whole. In the latter case, each of the first control unit 106 and the second control unit 109 may be referred to as an ECU.

<Hardware Configuration of Control Unit>

Figure 2:
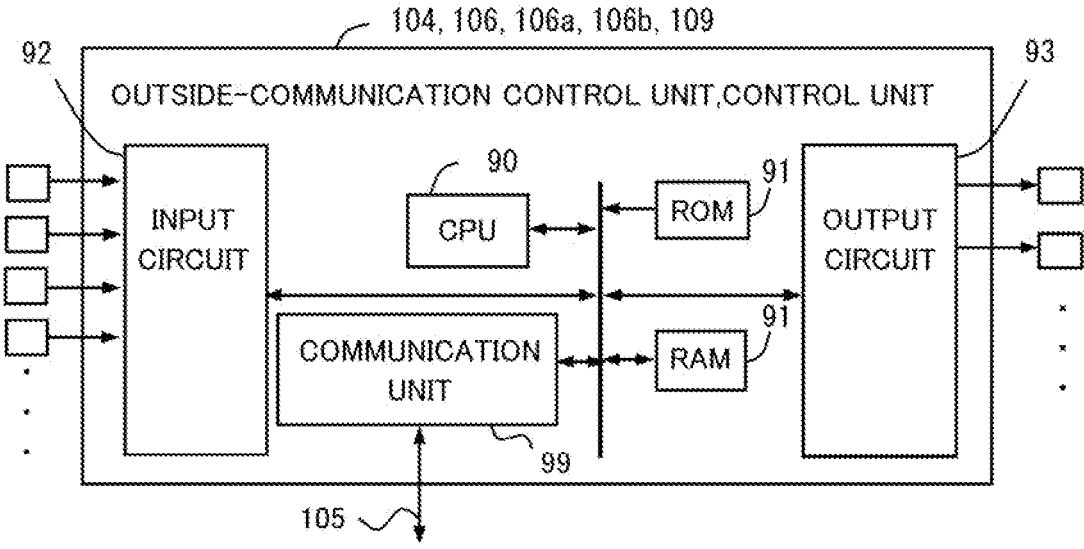
FIG. 2 is a hardware configuration diagram of a control unit according to Embodiment 1.

FIG. 2 represents a hardware configuration diagram of the control unit according to Embodiment 1. The hardware configuration diagram in FIG. 2 can be applied to each of the first control units 106, 106a, and 106b, the second control unit 109, and the outside-communication control unit 104. Hereinafter, as a representative, the first control unit 106 will be explained. The respective functions are realized by processing circuits provided in the first control unit 106. Specifically, as illustrated in FIG. 2, the first control unit 106 includes, as the processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, an interface that exchanges data with an external apparatus such as a communication unit 99, and the like. The computing processing unit 90 in FIG. 2 corresponds to each of the first computing processing units 107, 107a, and 107b and each of the second computing processing units 110 and 110a in each corresponding one of FIGS. 1, 8, and 10. The storage apparatus 91 corresponds to each of the first storage apparatus 108, the second storage apparatus 111, and the storage apparatus 112 in each corresponding one of FIGS. 1, 8, and 10.

It may be allowed that as the computing processing unit 90, an ASIC (Application Specific Integrated Circuit), an IC (Integrated Circuit), a DSP (Digital Signal Processor), an FPGA (Field Programmable Gate Array), any one of various kinds of logic circuits, any one of various kinds of signal processing circuits, or the like is provided. It may be allowed that as the computing processing unit 90, an SoC (System on a Chip) technology is adopted. In addition, it may be allowed that as the computing processing unit 90, two or more computing processing units of the same type or different types are provided and respective processing items are executed in a sharing manner. As the storage apparatuses 91, there are provided a RAM (Random Access Memory) that can read data from and write data in the computing processing unit 90, a ROM (Read Only Memory) that can read data from the computing processing unit 90, and the like in the first control unit 106. The storage apparatus 91 may be incorporated in the computing processing unit 90. The input circuit 92 is connected with an input signal, sensors, and switches and is provided with an A/D converter and the like for inputting the input signal and signals from the sensors and the switches to the computing processing unit 90. The output circuit 93 is connected with electric loads such as a gate driving circuit for on/off-driving the switching devices and the like, and is provided with a driving circuit and the like for outputting control signals from the computing processing unit 90 to these electric loads. The communication unit 99 can exchange data with external apparatuses such as an external communication apparatus, an external storage apparatus, and an external control apparatus via the in-vehicle communication channel 105.

The computing processing unit 90 runs software items (programs) stored in the storage apparatus 91 such as a ROM and collaborates with other hardware devices in the first control unit 106, such as the storage apparatus 91, the input circuit 92, and the output circuit 93, so that the respective functions provided in the first control unit 106 are realized. Setting data items such as a threshold value and a determination value to be utilized in the first control unit 106 are stored, as part of software items (programs), in the storage apparatus 91 such as a ROM. It may be allowed that the respective functions included in the first control unit 106 are configured with either software modules or combinations of software and hardware.

<Functions of Outside-Communication Control Unit>

Figure 3:
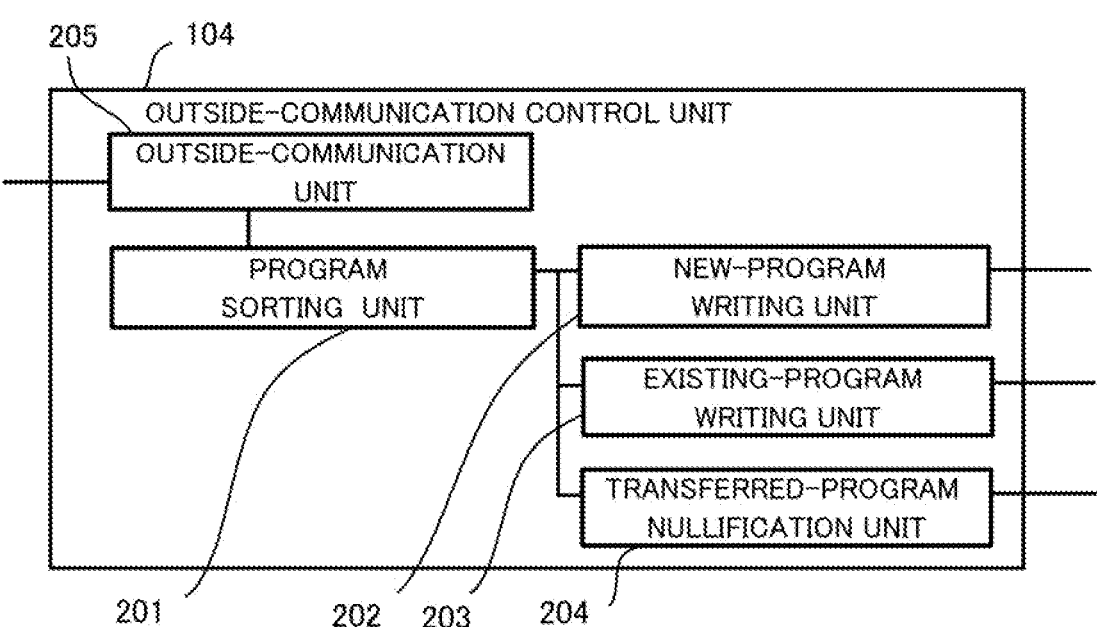
FIG. 3 is a block diagram of an outside-communication control unit according to Embodiment 1.

FIG. 3 is a block diagram for explaining the functions of the outside-communication control unit 104 according to Embodiment 1. The outside-communication control unit 104 has a program sorting unit 201, a new-program writing unit 202, an existing-program writing unit 203, and a transferred-program nullification unit 204. It may be allowed that these functions are provided not in the outside-communication control unit 104 but in the first control unit 106 or the second control unit 109.

An outside-communication unit 205 has a function of communicating with the server 103 via the wide area network 102. By way of the outside-communication unit 205, the vehicle control apparatus 120 can receive, from the server 103, not only an updating list in which updating-program information items related to updating programs are described but also data items related to the updating programs. The program sorting unit 201 comprehends the situation where respective executable programs for the first computing processing unit 107 and the second computing processing unit 110 provided in the vehicle control apparatus 120 are stored in the first storage apparatus 108 and the second storage apparatus 111. The program sorting unit 201 has a function of receiving a program updating list from the server 103, sorting programs stored in the storage apparatus within the vehicle control apparatus 120, as existing programs, and sorting programs that are not stored in the storage apparatus within the vehicle control apparatus 120, as new programs. In the present embodiment, the information items for the programs stored in the first storage apparatus 108 and the second storage apparatus 111 are preliminarily stored in the program sorting unit 201; however, it may be allowed that these information items are shared by the first storage apparatus 108 and the second storage apparatus 111. In addition, it may be allowed that each time it is required, the program sorting unit 201 inquires of the respective storage apparatuses these information items.

The new-program writing unit 202 has a function of receiving data for a new program from the server 103, by way of the outside-communication control unit 104, and writing the data, via the in-vehicle communication channel 105, in the storage area of the storage apparatus of the computing processing unit that executes the new program. In this situation, in the writing function, the outside-communication control unit 104 may not perform the operation of directly writing in the storage apparatus. That is to say, it may be allowed that the outside-communication control unit 104 instructs the outside-communication unit 205 to make the data to be written flow in the in-vehicle communication channel 105 and then instructs the storage apparatus to write the data that has been made to flow in the in-vehicle communication channel 105.

The existing-program writing unit 203 has a function of reading an existing program from the storage area of the storage apparatus in which the existing program exists and writing, by way of the in-vehicle communication channel 105, the existing program in the storage area of the storage apparatus of the computing processing unit that executes the existing program. In this situation, in the writing function, the outside-communication control unit 104 may not perform the operation of directly writing in the storage apparatus. That is to say, it may be allowed that the outside-communication control unit 104 instructs the storage apparatus in which the existing program is stored to make the data to be written flow in the in-vehicle communication channel 105 and then instructs the storage apparatus in which the existing program is to be written to write the data that has been made to flow in the in-vehicle communication channel 105.

The transferred-program nullification unit 204 has a function of instructing the storage apparatus in which an existing program is stored to transfer the existing program and nullifying the transfer-source program so that it does not operate, after writing the existing program in a required storage apparatus has been completed. In this case, the nullification may be performed in such a way that a program is deleted from the transfer-source storage apparatus so as to secure the memory capacity. It may also be allowed that the program is not deleted from the transfer-source storage apparatus, but a flag indicating that the program is unusable is set. In addition, in the case where an existing program stored in the transfer-source storage apparatus is executed in a parallel manner by the computing processing unit that executes the program written in the transfer-source storage apparatus, no nullification is required.

<Flow of Program Updating Processing>

Figure 4:
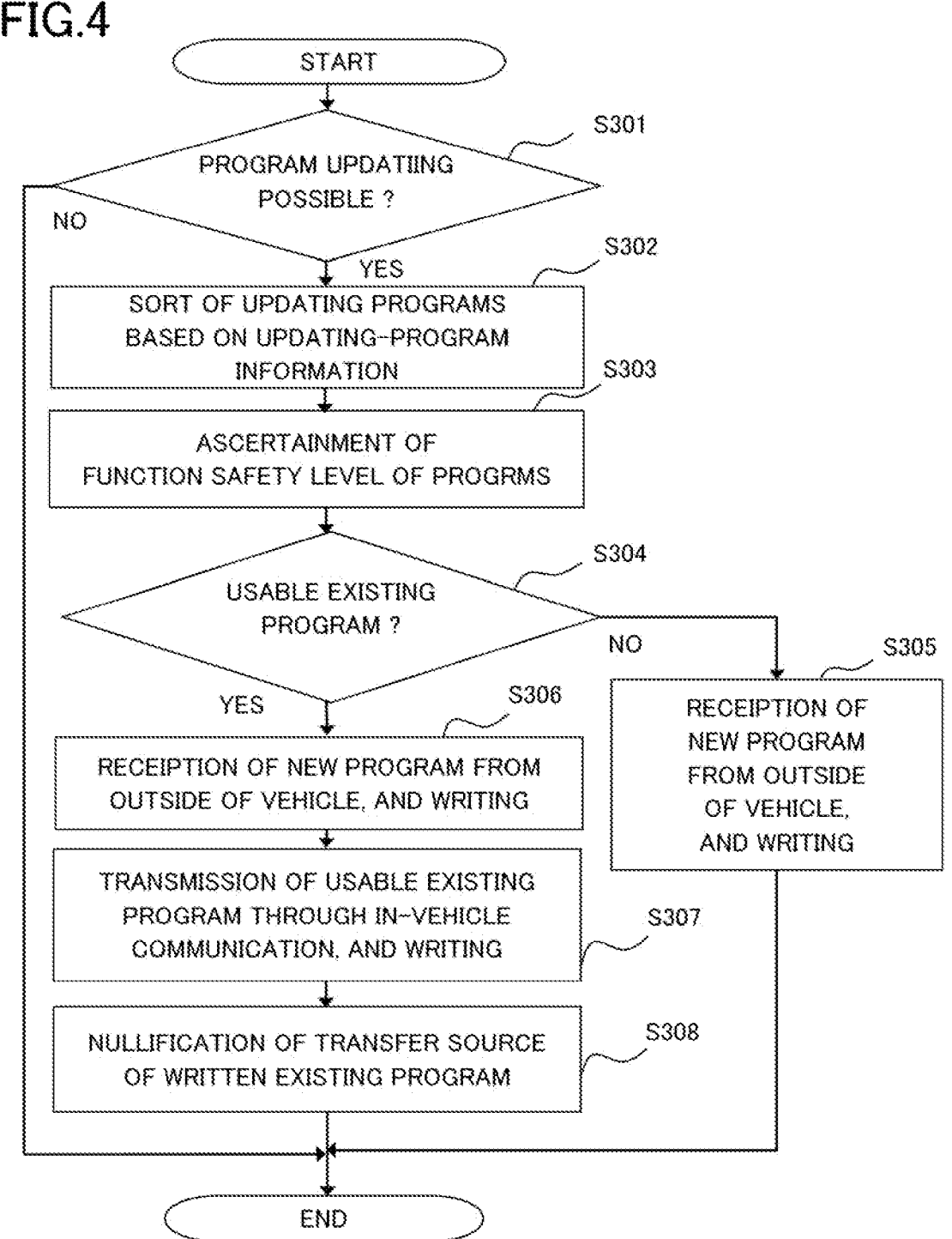
FIG. 4 is a flowchart of program updating processing according to Embodiment 1.

FIG. 4 is a flowchart of program updating processing according to Embodiment 1. There will be explained the flow in which the respective functions of the outside-communication control unit 104, explained with reference to FIG. 3, operate.

The flowchart in FIG. 4 is executed each time the server 103 demands the outside-communication control unit 104 to update a program for the vehicle control apparatus 120. In the step S301, it is determined whether or not updating of a program, required by the server 103, is possible. For example, it is determined that the updating is possible, when the program rewriting causes no problem in the vehicle operation, for example, when the vehicle is in a parking state.

In the step S301, when it is determined that the program updating is not possible, the program updating is not performed and then the program updating processing is ended directly. In the step S301, when it is determined that the program updating is possible, the step S301 is followed by the step S302.

In the step S302, updating programs are sorted based on updating-program information received from the server 103. It is determined whether or not there exists a program, in programs to be added or updated, that has already been stored in any memory area within the whole vehicle area. FIG. 5 is an explanatory table of program information items stored in the memory area of the computing processing unit according to Embodiment 1.

In this case, there is represented the situation where the first computing processing unit 107 and the second computing processing unit 110 are the computing processing units mounted in the vehicle and where the respective programs to be executed by the computing processing units are stored in the first computing processing unit 107 and the second computing processing unit 110. As represented in FIG. 5, the outside-communication control unit 104 preliminarily stores the names of the respective programs stored in the storage apparatuses, the respective versions of the programs, the respective names indicating the functions, and the respective data items of function safety levels.

In this situation, each of the functions represented in FIG. 5 is the one to be obtained through the operation of the corresponding program. The foregoing functions include all the functions to be controlled by the vehicle control apparatus mounted in a vehicle, for example, an acceleration-asynchronous injection function in the engine control apparatus, an anti-skid braking function in the braking control apparatus, a sign information acquisition function in the car navigation apparatus, and the like.

In addition, the function safety level in FIG. 5 is, for example, the ASIL (Automotive Safety Integrity Level) representing electric- and electronic-system safety level established by ISO26262; the levels are indicated by four stages; "A" and "D" are parameters that are the lowest and the highest ones, respectively. In the case any ASIL is not allocated but measures based on an appropriate quality control scheme are taken even when no safety requirement exists, the notation "QM (Quality Management)" is utilized. In FIG. 5, the respective function safety levels for the functions to be generally regulated are stored, as "integrated function safety level", in the outside-communication control unit 104. Moreover, the function safety levels related only respective software items of the functions are extracted and defined as "software function safety levels" and the function safety levels related only respective hardware items of the functions are extracted and defined as "hardware function safety levels"; both the software function safety levels and the hardware function safety levels are stored in the outside-communication control unit 104. For example, the software portion of Prog2A in the second computing processing unit 110 satisfies "ASIL A"; however, because the hardware portion such as the second storage apparatus 111 barely satisfies the QM standard, the function C that works through the operation of Prog2A installed in the second computing processing unit 110 has the function safety level of the QM.

FIG. 6 is an explanatory table of information items for the programs that are in the storage area of the computing processing unit according to Embodiment 1 and are to be updated. The information items, in FIG. 6, for the programs to be updated are transmitted from the server 103 to the outside-communication control unit 104. In this situation, the case where a program is updated includes the case where a program is changed and the version thereof is upgraded and the case where a function is added to a program so that a new program is set. With regard to the case where a function is added, when the function can be added by writing an additional program only, only the additional program is written. Accordingly, it is made possible to reduce the writing amount of the program to a minimally necessary one and to shorten the time consumed in updating the program.

The information items, for the programs to be updated, that are received from the server and are represented in FIG. 6 are collated with the information items, for the program stored in the respective storage apparatuses represented in FIG. 5, that have preliminarily been comprehended by the outside-communication control unit 104. When there exist the same programs, the programs are sorted as the updating programs. In this situation, the sorting of the same programs are performed only in the case where all the following conditions are satisfied; the respective program names in FIG. 6 and FIG. 5 coincide with each other, the version in FIG. 6 is lower than that in FIG. 5, and the respective functions in FIG. 4 and FIG. 5 are the same.

FIG. 6 represents the case where information items for the updating programs are received so that in order to realize, in the first computing processing unit 107, the function E in which the function F associate with the function C, programs Program1C and Program2A are added to the first storage apparatus 108. the program Program1C is a program that is not described in FIG. 5. Accordingly, in the step S302, the Program1C is sorted as a new program. The program Prog2A in FIG. 6 already exists in the second storage apparatus 111 in FIG. 5, and the version thereof is the same as or lower than that in FIG. 5. Accordingly, in the step S302, the program Prog2A described in FIG. 6 is sorted as an existing program.

Next, in the step S303, it is ascertained whether or not with regard to the existing program sorted in the step S302, the function safety can be ensured. Only when the integrated function safety level in the case where an existing program is executed by the computing processing unit in which the existing program exists is the same as or lower than the function safety level in the case where the existing program is executed by the computing processing unit for executing an updating program, the existing-program writing unit 203 writes the data for the existing program. This method makes it possible that when the execution main body for an existing program is changed, the original integrated function safety level is prevented from being deteriorated.

Among the updating-program information items, the program Prog2A, which is an existing program, exists in the second storage apparatus 111; thus, when the program Prog2A is executed by the second computing processing unit 110, the integrated function safety level is QM, according to FIG. 5. In contrast, when the program Prog2A is written in the first storage apparatus 108 and then is executed by the first computing processing unit 107, the integrated function safety level is ASIL A. Because when these cases are compared with each other, the original integrated function safety level QM is the same as or lower than the integrated function safety level ASIL A in the case where the program Prog2A is executed by the first computing processing unit 107 specified by the updating-program information, it is determined that the program Prog2A is usable.

In the step S304, it is determined whether or not among programs to be updated, there exists a program that is sorted as an existing program and can be utilized. When in the step S304, there is a usable existing program, the step S304 is followed by the step S306, where writing of a new program is started. When in the step S304, it is determined that there is no usable existing program, the step S304 is followed by the step S305, where a new program is written. These processing from the step S302 through the step S304 corresponds to the function of the program sorting unit 201.

In the step S305, the server 103 performs data transmission of a new program. Then, the new program is written in a specified memory area and the program updating is ended.

In the step S306, the server 103 performs data transmission of a new program through outside-vehicle communication. Then, the new program is written in a specified storage apparatus. In the present embodiment, the program Prog2A in FIG. 5 has been sorted as a usable existing program. In the step S306, the server 103 performs data transmission of only the program Prog1C, as a new program, in FIG. 6 through the outside-vehicle wide area network 102 and is written in the first storage apparatus 108.

As a result, data transmission related to the program Prog2A through outside-vehicle communication can be omitted. This method makes it possible to reduce the bandwidth of communication through the outside-vehicle wide area network 102, to reduce the security risk in the outside-vehicle communication, and to reduce the power consumption in the outside-vehicle communication. Each of the step S305 and the step S306 corresponds to the function of the new-program writing unit 202.

In the step S307, the usable existing program Prog2A is written through in-vehicle communication. The program Prog2A in FIG. 6 is an existing program, i.e., the same as the program Prog2A in the second storage apparatus 111 in FIG. 5. Accordingly, the program Prog2A is transferred from the second storage apparatus 111 through the in-vehicle communication channel 105 and is written in the first storage apparatus 108.

Thus, when the programs Prog1C and Prog2A are written, as the additional program and the updating program, respectively, in the first storage apparatus, the program Prog2A is written by use of the in-vehicle communication whose speed is higher than that of the outside-vehicle communication; therefore, the time until the program has been rewritten can be shortened. The step S307 corresponds to the function of the existing-program writing unit 203.

In the step S308, the existing program Prog2A stored in the second storage apparatus 111, which is the transfer source of the existing program Prog2A that has already been written, is nullified. After the program Prog2A has been written in the first storage apparatus 108 in the step S307, the program Prog2A exists in each of the first storage apparatus 108 and the second storage apparatus 111. The reason why the foregoing nullification of the existing program Prog2A is performed is that in the case where the two programs Prog2A are computed by the different computing processing units and instructions are issued to an electric load such as an actuator, the vehicle operation may fail.

In addition, considering the whole vehicle area, the processing loads for the programs Prog2A and the memory occupation amounts thereof overlap each other. Accordingly, in the step S308, the existing program Prog2A that has already been stored in the second storage apparatus 111, which is the transfer source, is nullified.

As the nullification method, for example, it is conceivable that the program Prog2A is deleted from the second storage apparatus. In addition, for example, in the case where the program Prog2A written in the first storage apparatus 108 in the step S307 functions only for a specified period and it is later required to restore the operation of the program Prog2A in the second storage apparatus 111, it may be allowed that while leaving the program Prog2A in the second storage apparatus 111, a flag of use suspension is set in order to prevent the operation thereof.

As a result, it is made possible to prevent a vehicle-operation failure caused by the overlapped programs in the whole vehicle area, to reduce the computing processing load, and to reduce the memory capacity. This step S308 corresponds to the function of the transferred-program nullification unit 204. After the step S308, the processing is ended.

<Sequence Diagram>

Heretofore, the flow of the program updating processing of Embodiment 1 has been explained in accordance with the flowchart in FIG. 4. This processing will be explained by use of the sequence diagram in FIG. 7.

Figure 7:
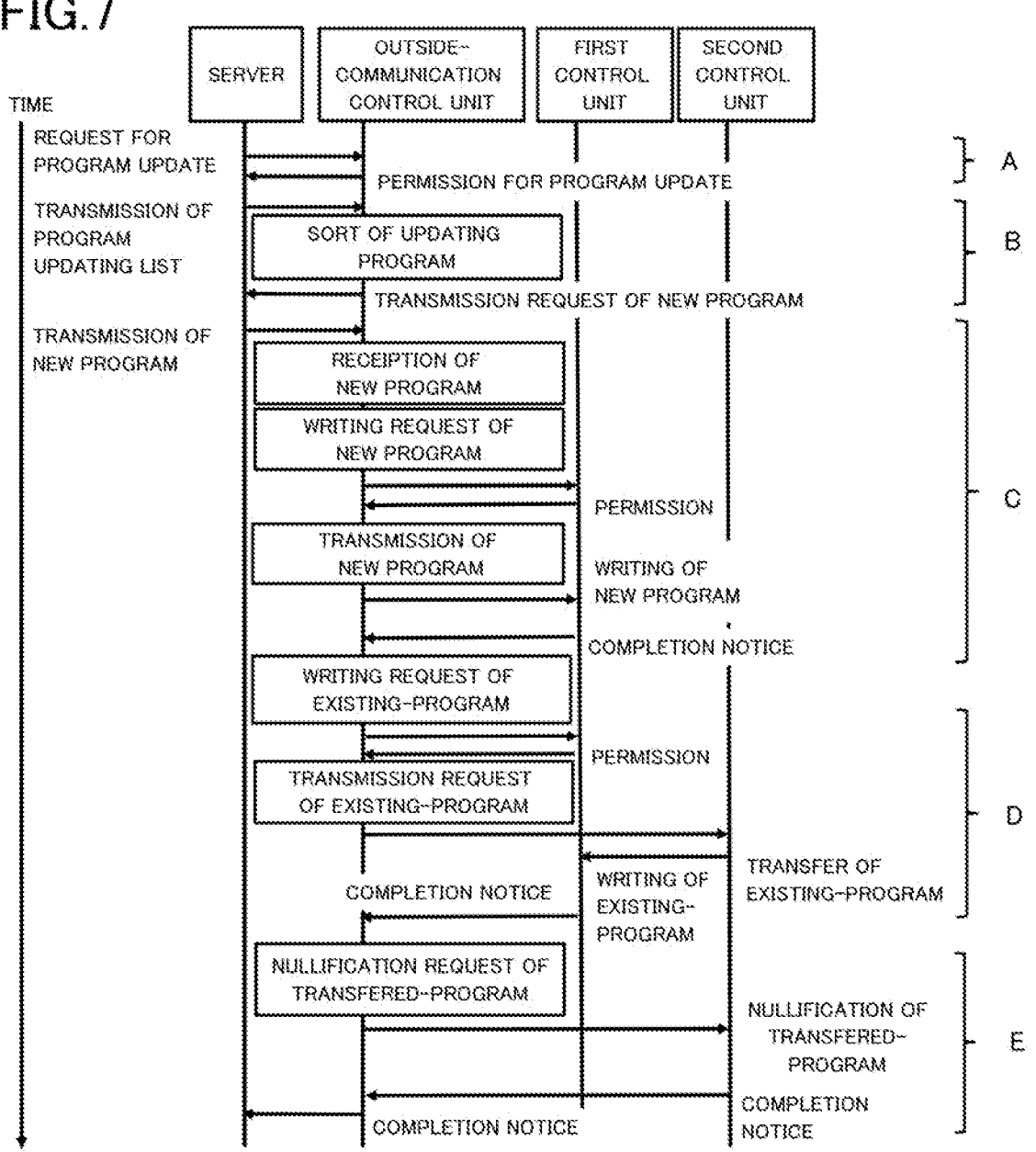
FIG. 7 is a sequence diagram of the program updating processing according to Embodiment 1.

At first, in the section A in FIG. 7, program updating is requested between the server 103 and the outside-communication control unit 104; if the program updating is possible, an answer of updating permission is returned. In the case where the updating is possible, a program updating list that the outside-communication control unit 104 has received from the server 103 is checked in the section B. Then, among the updating programs, there are sorted the respective existing programs that exist in the first control unit 106 and the second control unit 109 and whose function safety levels can be ensured. The programs other than the existing programs, among the updating programs, are sorted as the new programs; then, the transmission requests therefor are transmitted to the server 103.

To date, because there has not been any sequence of the section B, all updating programs have been transmitted from the server 103 to the outside-communication control unit 104 in the sequence of the section C and have been written in the storage apparatuses. However, in Embodiment 1, only the new programs excluding the existing programs are transmitted from the server 103 to the outside-communication control unit 104 in the section C. Accordingly, it is made possible to reduce the communication band in which the server 103 and the outside-communication control unit 104 communicate with each other through the wide area network 102, while ensuring the function safety levels of the programs to be updated and the existing programs. Reduction of the communication band for the outside-vehicle communication makes it possible to reduce the security risk in the outside-vehicle communication and to reduce the power consumption in the outside-vehicle communication.

In the section D, the existing programs are written from the second control unit where the existing programs exist to the first control unit through the in-vehicle communication channel 105 whose speed is higher than that of the outside-vehicle communication. As a result, the program rewriting completion time can be shortened. In the case represented in FIG. 7, the program to be updated is written in the first control unit 106 through the sequences in the sections C and D. Moreover, in the sequence of the section E, the operation of the existing program, in the second control unit 109, that has been written in the first control unit 106 is nullified. As a result, in the vehicle operation after the completion of the writing, it is made possible to prevent a vehicle-operation failure caused by overlapped programs in the whole vehicle area, to reduce the computing processing load, and to reduce the memory capacity.

In Embodiment 1, there has been explained the configuration in which the first storage apparatus 108 is provided in the first control unit 106 and the second storage apparatus 111 is provided in the second control unit 109. However, the configuration is not limited to the foregoing one; the same effect can be demonstrated even with configuration in which both the first storage apparatus 108 and the second storage apparatus 111 are provided in the first control unit 106.

In addition, in Embodiment 1, the outside-communication control unit 104 is an apparatus that can perform communication through the wide area network 102; however, it may be allowed that the outside-communication control unit 104 is an apparatus that is connected by means of a cable. In that case, the server 103 becomes an apparatus that can transmit updating programs possessed by a car maker or a dealer, and the outside-communication control unit 104 performs communication through a cable.

In the vehicle control apparatus 120 according to Embodiment 1, when there is rewritten the storage area of a storage apparatus where a program to be executed by an in-vehicle computing processing unit is stored, existing programs, among the programs to be rewritten, that have already been stored in the storage are to be utilized by another computing processing unit are sorted. Then, the updating program other than the existing programs is rewritten, as a new program, through outside-vehicle communication. The existing program can be rewritten by means of in-vehicle communication from another computing processing unit. This method makes it possible to reduce the communication bandwidth for the outside-vehicle communication at a time of program rewriting, to reduce the security risk in the outside-vehicle communication, to reduce the power consumption in the outside-vehicle communication, and to shorten the program rewriting completion time.

In addition, it is defined that the function safety level of the program to be written by the existing-program writing unit 203 is the same as or lower than that of the program in the storage area of the storage apparatus in which the program is written. As a result, the respective function safety levels of the program to be updated and the existing program can be ensured. Thus, it is made possible to reduce the communication bandwidth for the outside-vehicle communication at a time of program rewriting, to reduce the security risk in the outside-vehicle communication, to reduce the power consumption in the outside-vehicle communication, and to shorten the program rewriting completion time. In addition, the program in the transmission source of an existing program is prevented from operating in the original computing processing unit after the writing by the existing-program writing unit 203 has been completed. As a result, in the vehicle operation after the completion of the writing, it is made possible to prevent a vehicle-operation failure caused by overlapped programs, to reduce the computing processing load, and to reduce the memory capacity.

2. Embodiment 2

Figure 8:
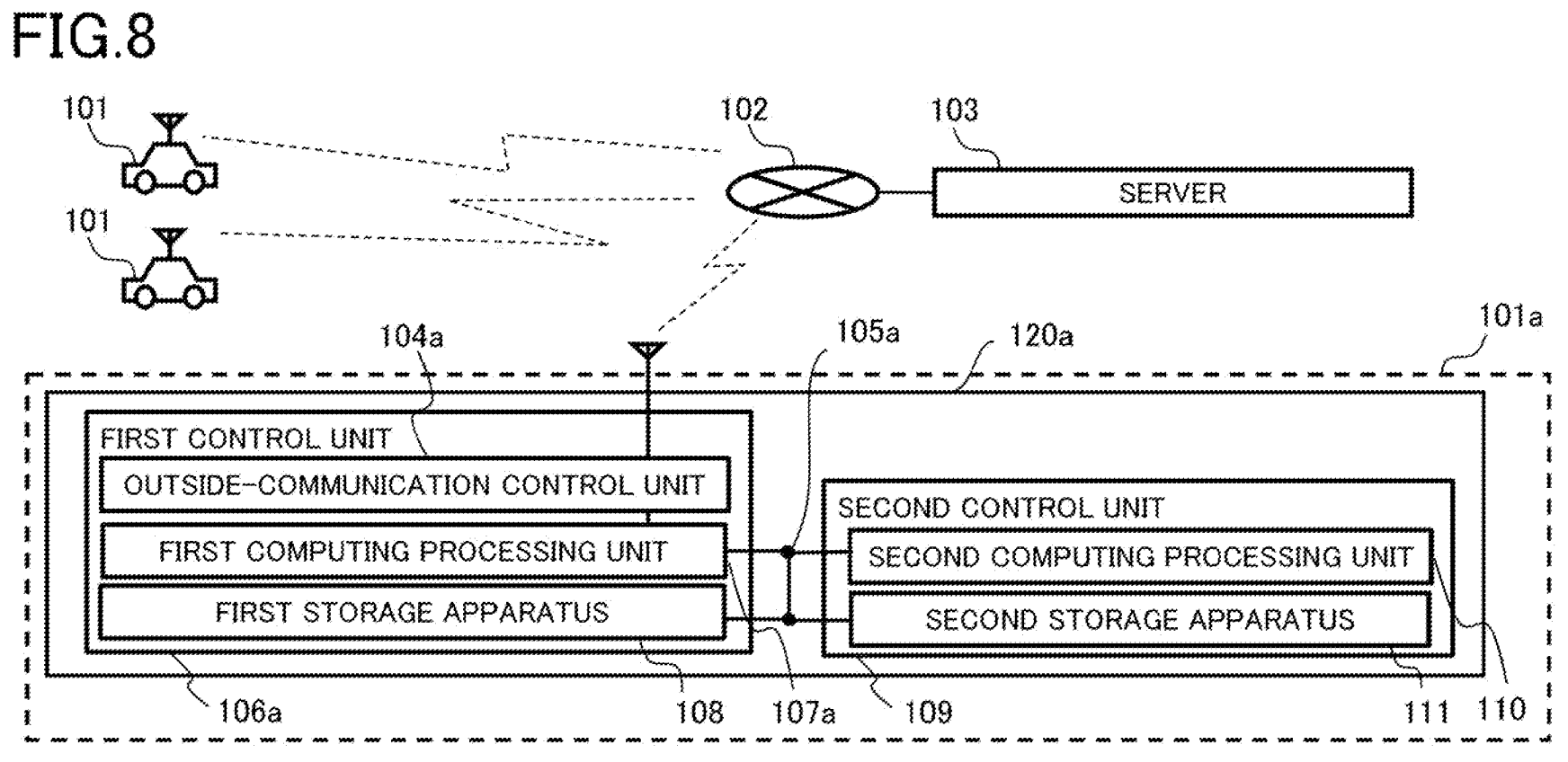

FIG. 8 is a configuration diagram of a vehicle control apparatus 120*a* according to Embodiment 2. FIG. 9 is a sequence diagram of program updating processing according to Embodiment 2.

FIG. 8 represents the state where the vehicle control apparatus 120*a* is mounted in a vehicle 101*a*. The vehicle control apparatus 120*a* according to Embodiment 2 is different from the vehicle control apparatus 120 according to Embodiment 1 in that a first control unit 106*a* has an outside-communication control unit 104*a*, i.e., the outside-communication control unit 104 is incorporated in the first control unit 106.

Because being connected with each other inside the first control unit 106*a*, the outside-communication control unit 104*a* and a first computing processing unit 107*a* can exchange data with each other without intermediary of an in-vehicle communication channel 105*a*. Accordingly, it is made possible to perform higher-speed writing operation. In this case, the respective functions of the blocks represented in FIG. 3 are executed, as the functions of the first control unit 106*a*.

The program-updating-processing sequence diagram in FIG. 9 represents, as internal processing items in the first control unit 106*a*, the communication between the outside-communication control unit 104 and the first control unit 106 in the sequence diagram in FIG. 7. Because the respective sequences represented in the sections A, B, C, D, and E in FIG. 9 are the same as those corresponding sequences represented in FIG. 7, the explanations therefor will be omitted.

3. Embodiment 3

FIG. 10 is a configuration diagram of a vehicle control apparatus 120*b* according to Embodiment 3. FIG. 10 represents the state where the vehicle control apparatus 120*b* is mounted in a vehicle 101*b*. The vehicle control apparatus 120*b* according to Embodiment 3 is different from the vehicle control apparatus 120*a* according to Embodiment 2 in that a second computing processing unit 110*a* is incorporated in a first control unit 106*b*.

Moreover, the program to be executed by a first computing processing unit 107*b* and the program to be executed by the second computing processing unit 110*a* are stored in a first storage area 112*a* and a second storage area 112*b*, respectively; the first storage area 112*a* and the second storage area 112*b* are included in one and the same storage apparatus 112. The outside-communication control unit 104*a*, the first computing processing unit 107*b*, the second computing processing unit 110*a*, and the storage apparatus 112 are connected with one another in the first control unit 106*b* and can exchange data with one another without intermediary of the in-vehicle communication channel 105*a*. Accordingly, it is made possible to perform higher-speed transfer operation and writing operation.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, at least one of the constituent components may be modified, added, or eliminated; moreover, at least one of the constituent components mentioned in at least one of the preferred embodiments may be selected and combined with the constituent components mentioned in another preferred embodiment.

The invention claimed is:

1. A vehicle control apparatus comprising:

computing processors comprising a first computing processor and a second computing processor;

a storage area of a storage apparatus that is provided for each of the computing processors and in which a program to be executed by the first computing processor is stored;

an internal communication bus configured to enable communication among the computing processors;

a communication interface configured to receive, from an outside, updating-program information related to an updating program for updating the program to be executed by the first computing processor and data related to the updating program;

wherein the computing processors are configured to:

sort, based on the updating-program information, the updating program into an existing program already existing in the storage area for the second computing processor excluding the first computing processor that executes the updating program and into a new program that does not exist in any storage areas for the computing processors;

obtain data for the new program obtained through sorting, by way of the communication interface, and then write the data in the storage area for the first computing processor that executes the updating program, by way of the internal communication bus; and read data for the existing program obtained through sorting, from a transfer-source storage area, and then write the data for the existing program in the storage area for the first-computing processor that executes the updating program.

2. The vehicle control apparatus according to claim 1, wherein from the outside, the communication interface receives data for the updating program that adds a new function to the program to be executed by the first computing processor.

3. The vehicle control apparatus according to claim 2, wherein from the outside, the communication interface receives the updating-program information related to the updating program that adds the new function to the program to be executed by the first computing processor, and wherein when the updating programs are sorted into the new programs, only a portion for adding the new function of the new program is received from the outside, and then the portion is written in the storage area for the first computing processor that executes the updating program, by way of the internal communication bus.

4. The vehicle control apparatus according to claim 1, wherein the computing processors are configured to:

read the existing program obtained through sorting, from the transfer-source storage area where the existing program exist, write the existing program in the storage area for the first computing processor that executes the existing program, by way of the internal communication bus, and then, after completion of the writing, prevent the existing program from operating in the transfer-source storage area.

5. The vehicle control apparatus according to claim 1, wherein only when a function safety level in the case where the existing program is executed by the second computing processor in which the existing program exists is the same as or lower than a function safety level in the case where the existing program is executed by the first computing processor for executing the updating program, the computing processors are configured to write data for the existing program.

6. The vehicle control apparatus according to claim 1, wherein the computing processors are configured with an SoC.

* * * * *